United States Patent [19]

Acker

[11] 4,393,959
[45] Jul. 19, 1983

[54] HYDRAULIC STABILIZER FOR AXLE ON MAST LIFT VEHICLE

[75] Inventor: Alvin W. Acker, Topeka, Kans.

[73] Assignee: Allis-Chalmers Corporation, Milwaukee, Wis.

[21] Appl. No.: 214,642

[22] Filed: Dec. 10, 1980

[51] Int. Cl.³ .................... B66F 17/00; B60G 21/06
[52] U.S. Cl. ........................... 187/9 E; 187/9 R; 280/714; 280/755
[58] Field of Search ............ 414/631, 636, 699; 187/9 R, 9 E; 280/714, 755

[56] References Cited

U.S. PATENT DOCUMENTS

| 3,953,040 | 4/1976 | Unruh et al. | 280/714 X |
| 4,231,450 | 11/1980 | Hedtke et al. | 187/9 R |
| 4,235,308 | 11/1980 | Davis | 187/9 R |
| 4,264,014 | 4/1981 | Hogg et al. | 280/755 X |

Primary Examiner—Robert G. Sheridan
Attorney, Agent, or Firm—Arthur L. Nelson

[57] ABSTRACT

A hydraulic axle stabilizer for a pivotal axle on a fork lift truck operating responsive to extension of a mast lift to provide stability of the fork lift truck for higher lifts on the mast.

9 Claims, 7 Drawing Figures

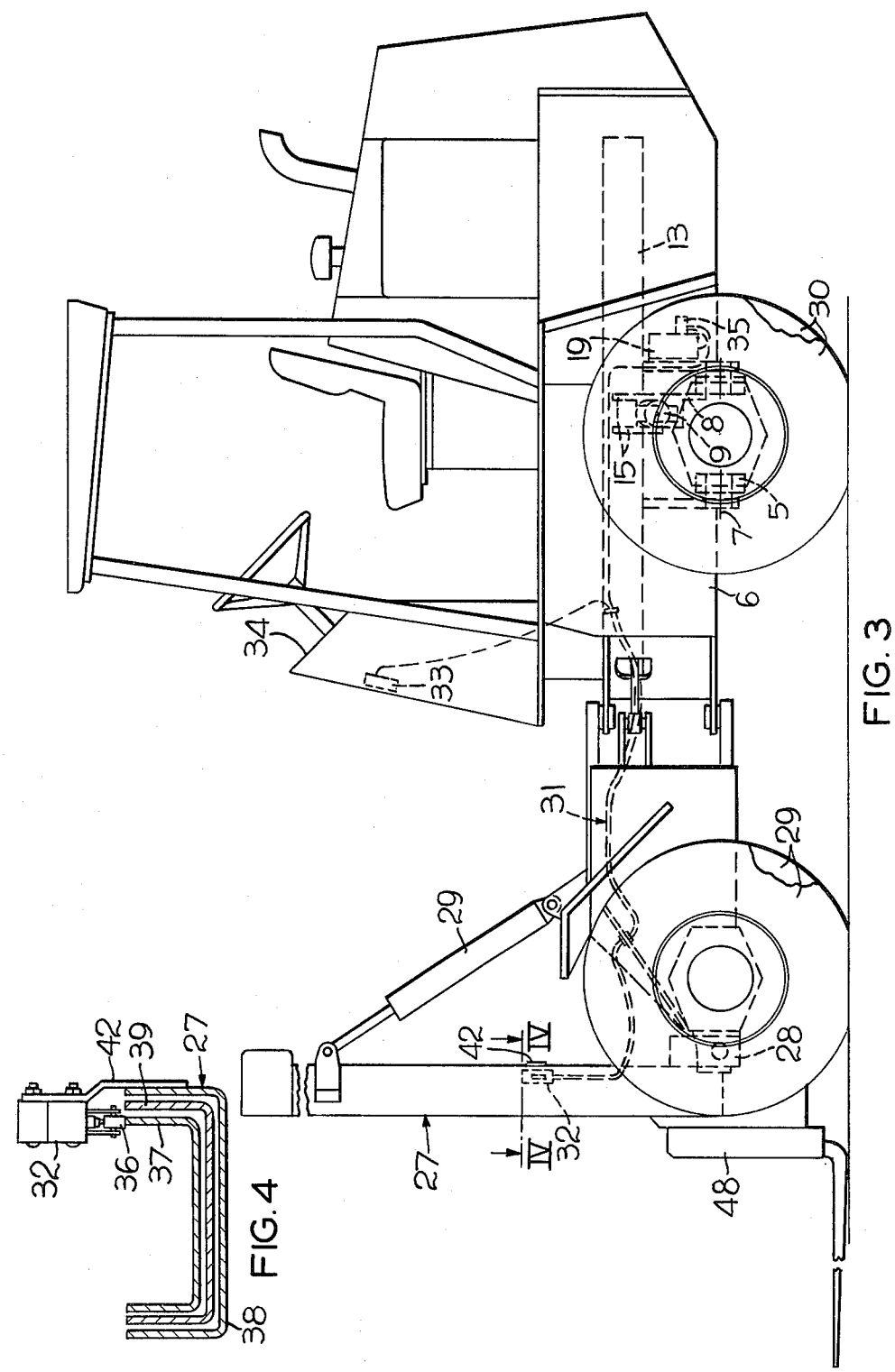

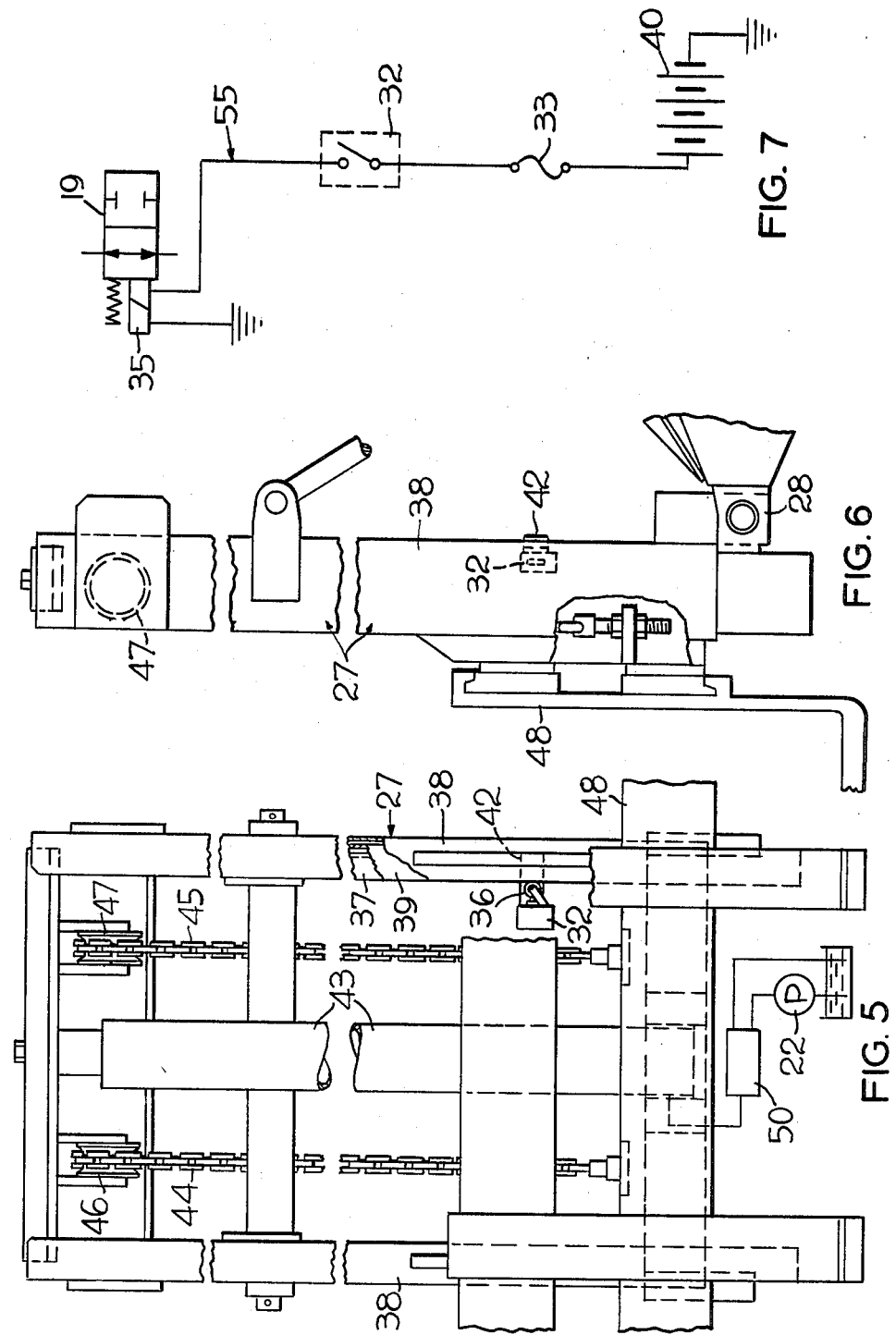

HYDRAULIC STABILIZER FOR AXLE ON MAST LIFT VEHICLE

This invention relates to a stabilizer for a pivotal axle and more particularly to a hydraulic rear axle stabilizer operating responsive to movement of the carriage for the fork lift truck above a predetermined level on the mast of a fork lift truck.

Earth moving vehicles such as backhoes are often provided with a stabilizer in the form of temporary footings which support at least a portion of the vehicle and carry a substantial portion of the load. The stabilizers usually remove the load from the tires and provide a stabilized condition for the vehicle. Tilt mechanisms have also been used for tilting of a vehicle on its axle through the use of hydraulic actuators such for which the scraper blade in accordance with the needs of the scraper blade. The U.S. Pat. No. 3,884,843, Martin, shows a tilt mechanism for the scraper blade using hydraulic actuators.

Fork lift trucks provided with a mast for lifting a carriage and a fork raises the load a substantial distance in the air. For low and medium lifts stabilizers are not required since the wheels provide adequate stability for this type of loading and lifting. For higher lifts, however, there is a need for greater stability; and, accordingly, the three point support of the vehicle which is normally the two front wheels and the pivot point for the rear axle is not adequate. Accordingly, if the pivotal axle were stabilized this would provide a four point support and greater stability for the vehicle which would accommodate lifting loads to higher lifts and yet maintain the stability of the vehicle. Accordingly, this invention provides hydraulic stabilizers which will lock the pivotal rear axle on a fork lift truck when the carriage for the fork is raised above a predetermined level. Above this level the vehicle is provided with a four point stabilizer support for the vehicle and maintaining greater stability for the mast for all higher lifts.

Accordingly, it is an object of this invention to provide a hydraulic stabilizer circuit on a fork lift truck for stabilizing the fork lift truck.

It is another object of this invention to provide a hydraulic stabilizer circuit and hydraulic actuators for locking the rear pivotal axle of a fork lift truck to provide greater stability of the vehicle.

It is a further object of this invention to provide a hydraulic stabilizer on the rear axle of the fork lift truck operating through an electrical circuit sensing the degree of lift of the fork carriage for controlling a solenoid valve in a hydraulic stabilizer circuit to lock the rear axle thereby providing greater stability for the vehicle when the fork carriage is raised above the predetermined height.

The objects of this invention are accomplished on a fork lift truck by hydraulic cylinders which extend between the chassis and a portion of the rear axle. A normally open solenoid valve in the hydraulic stabilizer circuit allows fluid to flow back and forth between the hydraulic actuators as the rear axle pivots, for lower operation of the fork carriage on the mast, whereby the rear axle is followed to pivot normally. When the carriage for the fork rises above a predetermined level, a electrical circuit is operated closing a limit switch which in turn energizes the solenoid valve. As the solenoid valve is closed, the hydraulic fluid is locked in the hydraulic actuators preventing pivotal movement of the axle and providing more stable support of the vehicle. This provides four points for support of the vehicle instead of the normal three point support which consists essentially of the two front wheels and the pivot point for the rear axle during normal operation. By increasing the base for supporting of the vehicle the greater stability is provided for the higher lifts of the fork carriage on the mast of the fork lift truck.

Referring to the drawings, the preferred embodiment of this invention is illustrated.

FIG. 3 is a side elevation view showing the electrical circuit operating to sense the level of the carriage on the mast of the fork lift truck;

FIG. 4 is a cross-section view taken on line IV—IV of FIG. 3 showing the sensor comprising a limit switch for sensing the carriage as it raises beyond a predetermined level;

FIG. 5 is a front view of the mast of a fork lift truck showing the limit switch mounted on the mast;

FIG. 6 is a side elevation view showing the limit switch for sensing height of the fork carriage;

FIG. 7 illustrates the electrical sensing circuit including the limit switch which senses the carriage on the mast when it reaches a predetermined height.

Figure 1:
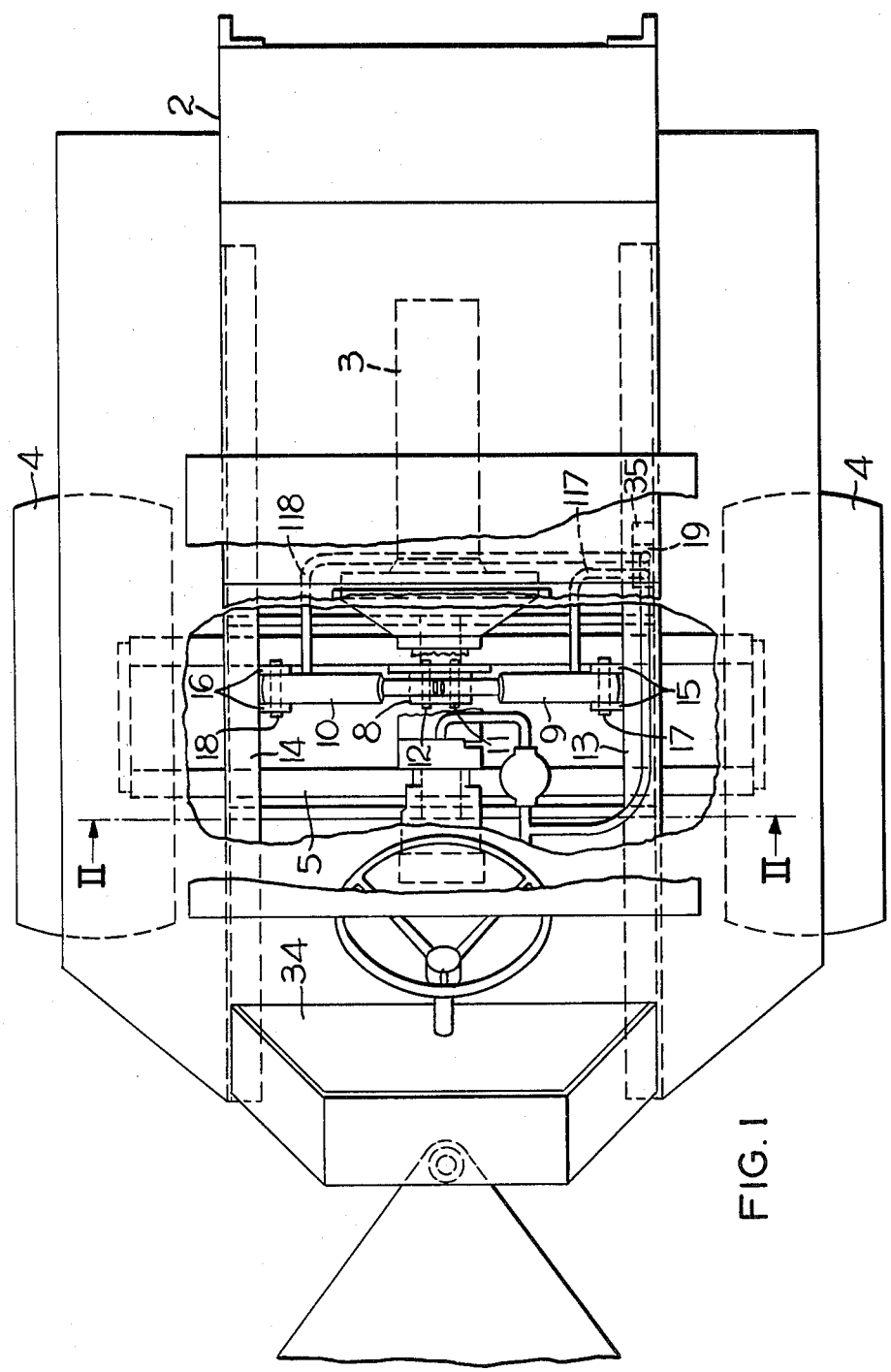
FIG. 1 illustrates a plan view of a fork lift truck showing the hydraulic stabilizer system for stabilizing the rear axle.
Figure 2:
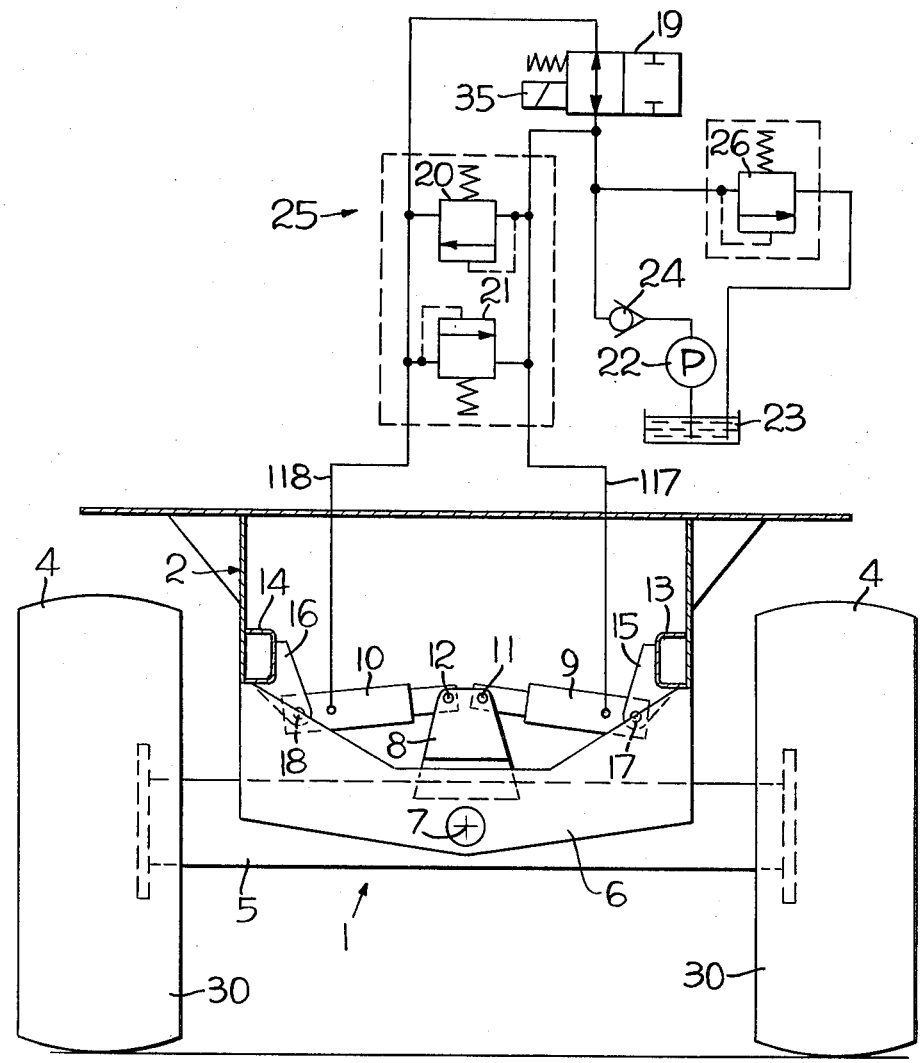
FIG. 2 illustrates a cross-section view taken on line II—II of FIG. 1 of the fork lift truck and a hydraulic stabilizer system.

FIGS. 1, 2 and 3 show a fork lift truck with a mast for lifting a load on a carriage which reciprocates vertically on the mast. The chassis 6 supports the body 2 of the vehicle. The engine 3 drives the rear wheels 4 which are carried on the rear axle 5. The rear axle 5 is pivotally connected to the chassis 6 at a pivot point 7. A bracket 8 mounted on the axle 5 carries the two hydraulic cylinders 9 and 10 pivotally through a pivotal connection 11 and 12. Vehicle chassis 6 includes the longitudinal beams 13 and 14. Each of the beams 13 and 14 carry a bracket 15 and 16. The brackets 15 and 16 are pivotally connected through pins 17 and 18 to the hydraulic cylinders 9 and 10. The conduits 117 and 118 are connected to the hydraulic cylinders 9 and 10 and through the solenoid valve 19. High pressure relief valves 20 and 21 also are connected across the conduits 117 and 118 to relieve high pressure fluid between the conduits 117 and 118 due to the rough terrain causing high pressure in the conduits.

The charge pump 22 receives fluid from the reservoir 23 which is supplied through the check valve 24 to the stabilizer circuit 25. A thermal relief valve 26 limits excessive pressure in the system and discharges into the reservoir 23 and maintains normal pressure in the system.

The mast 27 is pivotally supported on the base 28 and can be tilted by the tilt cylinder 29. The front wheels 29 carry the weight of the mast of the vehicles, while the rear wheels 30 support the pivotal rear axle 5. The rear axle 5 is pivotally connected to the chassis at the pivot point 7, as shown in FIG. 2.

The sensing circuit 31 is shown mounted on the vehicle in FIG. 3. The limit switch 32 senses the height of the carriage 48. The limit switch 32 is connected through the fuse block 33 mounted on the instrument panel 34. The circuit also includes the solenoid 35 which when energized closes the solenoid valve 19. The limit switch 32 is shown in FIGS. 4 and 7 in which a roller 36 engages the inner rail 37 as it reciprocates in the mast 27. The mast includes a stationary rail 38 and the movable rails 39 and 37. When the rail 37 lifts to a predetermined height the limit switch 32 closes to energize the solenoid 35 of solenoid valve 19.

FIG. 7 illustrates a sensing circuit 55 which includes a battery 40, fuse 33, limit switch 32, solenoid 35. A solenoid 35 operates the valve 19.

The bracket 42 carries the limit switch 32. When the hydraulic ram 43 is extended, the chains 44, 45 roll on the pulleys 46 and 47 and lift the carriage 48. Carriage 48 carries a fork for carrying a load. When the ram 43 is extended, the nested rails 37, 38 and 39 slide vertically relative to each other. The rail 38 remains stationary relative to the vehicle while the rails 37, 39 extend upwardly. When the rail 37 passes beyond the limit switch, the limit switch is then closed energizing the solenoid valve to close the stabilizing circuit.

The ram 43 is extended in response to controls on the fork lift truck which selectively pressurized fluid from a pump which is driven by the engine 3 to extend the mast. To lower the mast the control valve is opened allowing pressurized fluid to return to the reservoir.

A device operates in the following described manner.

The fork lift truck includes a mast 27 which extends and contracts in response to operation of the control valve 50 which is connected to the hydraulic pump 22 which is driven by the engine 3. As a fluid is pressurized in the ram 43, the mast extends and the carriage 48 lifts on the mast. As the inner rail 37 extends above the limit switch 32, the limit switch 32 which is normally open then closes. When the limit switch 32 closes, fluid in the stabilizer circuit 25 is no longer free to circulate in the system. The fluid then in the hydraulic rams 9 and 10 locks the axle 5 relative to the chassis 6. As long as the carriage 48 is at a predetermined height sensed by the limit switch 22 on rail 37, the solenoid valve 19 will be closed. This will provide stability because the rear axle will not be allowed to pivot. When the mast is lowered and the rail 37 engages the limit switch 32, the sensing circuit 55 will again be reenergized and solenoid valve 19 will open. In operating the mast below this height, the solenoid valve will be open and the front axle is free to pivot freely from one side to the other as the fluid will be transferred from one side to the other responsive to uneveness in the terrain.

The cross over relief valves 20 and 21 permit fluid flow between conduit 117 and 118 only for the purpose of relieving the circuit if high pressure is generated during normal operation when the solenoid 19 is closed.

The embodiments of the invention in which an exclusive property or privilege is claimed are defined as follows:

1. A stabilizer on a lift vehicle comprising, a vehicle having a lift mast, a lift carriage reciprocally mounted on said mast for carrying a load, a vehicle chassis, a pivotal axle pivotally supporting said vehicle chassis, a pair of hydraulic cylinders with each cylinder pivotally connected to said axle and to said chassis on opposing sides of said chassis, a hydraulic stabilizer circuit circulating hydraulic fluid in one cylinder and out the other cylinder of said hydraulic cylinders to allow pivoting of said axle, a normally open control valve between said hydraulic cylinders controlling the flow of hydraulic fluid in and out of said hydraulic cylinders, pressure relief valves for cross-over flow between said hydraulic cylinders controlling predetermined stabilizing forces, said control valve closing and interrupting flow in and out of said hydraulic cylinders responsive to the lift of the carriage on said mast lifting above a predetermined height thereby locking said hydraulic cylinders and rigidly fixing said axle with said chassis for stabilizing the support for said vehicle chassis.

2. A stabilizer on a lift vehicle as set forth in claim 1 including an electrical sensing circuit including a limit switch sensing carriage lift operating said control valve, said control valve defining a solenoid valve for controlling the flow of hydraulic fluid in and out of said hydraulic cylinders.

3. A stabilizer circuit on a lift vehicle as set forth in claim 1, a sensing circuit sensing the extension of said mast for controlling the flow of hydraulic fluid in and out of said hydraulic cylinders, a continuous source of pressurized fluid in said stabilizer circuit.

4. A stabilizer circuit on a lift vehicle as set forth in claim 1 wherein said hydraulic cylinders between said vehicle chassis and said axle lie in essentially a horizontal position.

5. A stabilizer on a lift vehicle as set forth in claim 1 including a sensing circuit sensing the degree of extension of said mast for closing and blocking fluid flow between said hydraulic cylinders and thereby locking said pivotal axle.

6. A stabilizer on a lift vehicle as set forth in claim 1 including said central valve defining a solenoid valve controlling the flow between said two hydraulic cylinders, a normally open limit switch in a sensing circuit sensing the degree of lift of said mast to control the flow between said hydraulic cylinders and blocking flow by energizing said solenoid valve when said mast reaches a predetermined level.

7. A stabilizer on a lift vehicle as set forth in claim 1 wherein said pressure relief valves connected between said two hydraulic cylinders relieve surges of high pressure in said stabilizer system when said control valve is open and said vehicle is moving.

8. A stabilizer on a lift vehicle as set forth in claim 1 wherein said vehicle defines a fork lift truck having telescoping rails in the mast, electrical sensing circuit for sensing height of said carriage, said electrical circuit including a limit switch mounted on one rail and sensing height of said mast by engaging another rail.

9. A stabilizer on a lift vehicle as set forth in claim 1 wherein said axle defines a rear axle on a fork lift truck, an electrical sensing circuit including a limit switch normally biased to an open position operating said central valve in said hydraulic circuit, said limit switch sensing a predetermined height of said carriage of said mast closing said central valve and locking said rear axle relative to said chassis.

* * * * *

UNITED STATES PATENT OFFICE
CERTIFICATE OF CORRECTION

Patent No. 4,393,959　　　　　　Dated July 19, 1983

Inventor(s) Alvin W. Acker

It is certified that error appears in the above-identified patent and that said Letters Patent are hereby corrected as shown below:

Column 4, lines 34, 56, 57 and 59, "central" should read --- control ---.

Signed and Sealed this

Twentieth Day of September 1983

[SEAL]

Attest:

GERALD J. MOSSINGHOFF

Attesting Officer　　　Commissioner of Patents and Trademarks